(12) United States Patent
Irvine et al.

(10) Patent No.: US 10,557,919 B2
(45) Date of Patent: Feb. 11, 2020

(54) OBSERVED TIME DIFFERENCE OF ARRIVAL ANGLE OF ARRIVAL DISCRIMINATOR

(71) Applicant: GUANGDONG OPPO MOBILE TELECOMMUNICATIONS CORP., LTD., Dongguan (CN)

(72) Inventors: Garry Irvine, Ottawa (CA); Peter Deane, Ottawa (CA)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 415 days.

(21) Appl. No.: 15/129,268

(22) PCT Filed: Mar. 28, 2014

(86) PCT No.: PCT/IB2014/060272
§ 371 (c)(1),
(2) Date: Sep. 26, 2016

(87) PCT Pub. No.: WO2015/145217
PCT Pub. Date: Oct. 1, 2015

(65) Prior Publication Data
US 2017/0108579 A1    Apr. 20, 2017

(51) Int. Cl.
*H01Q 3/00* (2006.01)
*G01S 5/08* (2006.01)
(Continued)

(52) U.S. Cl.
CPC ............... *G01S 5/08* (2013.01); *H01Q 3/36* (2013.01); *G01S 5/10* (2013.01); *H04W 64/00* (2013.01)

(58) Field of Classification Search
CPC ... G01S 5/08; G01S 5/10; H01Q 3/36; H04W 64/00
(Continued)

(56) References Cited

U.S. PATENT DOCUMENTS 4,443,801 A    4/1984 Klose et al.
4,975,710 A    12/1990 Baghdady
(Continued)

FOREIGN PATENT DOCUMENTS

CA    2 679 673 A1    3/2011
DE    102007027141 A1    12/2008
(Continued)

OTHER PUBLICATIONS

A. Tarighat, et al., Title: "Improved Wireless Location Accuracy Using Antenna Arrays and Interference Cancellation," Published in: Proceedings of 2003 IEEE International Conference on Acoustics, Speech, and Signal Processing, (ICASSP '2003), Date of Conference: Apr. 6-10, 2003, pp. 616-619 consisting of 4-pages.
(Continued)

*Primary Examiner* — Chuong P Nguyen
(74) *Attorney, Agent, or Firm* — Finnegan, Henderson, Farabow, Garrett & Dunner LLP (57) ABSTRACT

A method, user equipment (UE) and location server for estimating position of a UE based on observed angles of arrival. According to one embodiment, angles of arrival of signals from a plurality of base stations are received by a UE are observed by scanning for position reference signals (PRS) by adjusting a phase difference between antennas to cause a null of a beam of the UE to be incremented through an angular sector. For each of a plurality of base stations, an angle of arrival at which the null is steered when a PRS is suppressed by the null and a reference signal time difference, RSTD, are determined. Each angle of arrival and corre-
(Continued)

sponding RSTD is transmitted to a location server which estimates UE position based on the observed angles of arrival. Further, the location server may instruct the UE to suppress a non-line-of-sight PRS signal.

3 Claims, 7 Drawing Sheets

(51) Int. Cl.
*H01Q 3/36* (2006.01)
*G01S 5/10* (2006.01)
*H04W 64/00* (2009.01)

(58) Field of Classification Search
USPC .......................................... 342/372, 357.71
See application file for complete search history.

(56) References Cited

U.S. PATENT DOCUMENTS

| | | | |
|---|---|---|---|
| 5,477,230 A | 12/1995 | Tsui | |
| 6,442,392 B2* | 8/2002 | Ruutu | H04W 64/00 455/450 |
| 6,658,258 B1* | 12/2003 | Chen | G01S 5/02 342/458 |
| 6,700,536 B1 | 3/2004 | Wiegand | |
| 6,901,264 B2 | 5/2005 | Myr | |
| 7,711,375 B2* | 5/2010 | Liu | G01S 5/02 342/457 |
| 8,280,412 B2* | 10/2012 | Rudolf | H04W 64/00 455/115.1 |
| 8,326,324 B2* | 12/2012 | Wu | G01S 5/04 342/450 |
| 8,731,579 B2* | 5/2014 | Siomina | G01S 3/28 455/456.1 |
| 8,838,141 B2* | 9/2014 | Siomina | H04W 64/00 370/311 |
| 8,903,415 B2* | 12/2014 | Kazmi | H04W 64/00 455/443 |
| 9,507,007 B2* | 11/2016 | Markhovsky | G01S 3/74 |
| 9,807,560 B2* | 10/2017 | Rehnberg | H04W 64/00 |
| 10,045,324 B2* | 8/2018 | Zaidi | H04W 64/00 |
| 10,091,616 B2* | 10/2018 | Prevatt | H04W 4/023 |
| 2004/0023671 A1* | 2/2004 | Rudolf | G01S 5/12 455/456.5 |
| 2004/0248518 A1 | 12/2004 | Kashiwase | |
| 2008/0293435 A1 | 11/2008 | Maher et al. | |
| 2010/0184457 A1* | 7/2010 | Hupp | G01S 5/0289 455/517 |
| 2011/0124347 A1 | 5/2011 | Chen et al. | |
| 2013/0023285 A1 | 1/2013 | Markhovsky et al. | |
| 2013/0033999 A1* | 2/2013 | Siomina | G01S 5/0236 370/252 |
| 2015/0011238 A1* | 1/2015 | Tujkovic | H04W 4/02 455/456.1 |
| 2015/0195811 A1* | 7/2015 | Wu | H04W 4/02 455/436 |
| 2018/0180702 A1* | 6/2018 | Markhovsky | G01S 1/042 |
| 2018/0284149 A1* | 10/2018 | Kommi | G01C 21/165 |
| 2019/0037529 A1* | 1/2019 | Edge | H04L 5/005 |
| 2019/0166453 A1* | 5/2019 | Edge | G01S 5/06 |

FOREIGN PATENT DOCUMENTS

| | | |
|---|---|---|
| EP | 1 193 990 A1 | 4/2002 |
| EP | 2 282 574 A2 | 2/2011 |
| GB | 2162693 A1 | 2/1986 |

OTHER PUBLICATIONS

José A. del Peral-Rosado et al., Title: "Evaluation of the LTE Positioning Capabilities Under Typical Multipath Channels," Published in: 2012 6th Advanced Satellite Multimedia Systems Conference (ASMS) and 12th Signal Processing for Space Communications Workshop (SPSC), Date of Conference: Sep. 5-7, 2012, pp. 139-145 consisting of 8-pages.

José A. del Peral-Rosado et al., Title: "Joint Channel and Time Delay Estimation for LTE Positioning Reference Signals," Published in: 2012 6th ESA Workshop on Satellite Navigation Technologies and European Workshop on GNSS Signals and Signal Processing, (NAVITEC), Date of Conference: Dec. 5-7, 2012 consisting of 8-pages.

36 305 V9.10.0 (Feb. 2013) LTE; Evolved Universal Terrestrial Radio Access Network (E-UTRAN); Stage 2 functional specification of User Equipment (UE) positioning in E-UTRAN (3GPP TS 36.305 version 9.10.0 Release 9) Jan. 8, 2013 consisting of 51-pages.

36 305 V10.5.0 (Feb. 2013) LTE; Evolved Universal Terrestrial Radio Access Network (E-UTRAN); Stage 2 Functional Specification of User Equipment (UE) Positioning in E-UTRAN (3GPP TS 36.305 version 10.5.0 Release 10) Jan. 8, 2013 consisting of 51-pages.

36 305 V11.3.0 (Apr. 2013) LTE; Evolved Universal Terrestrial Radio Access Network (E-UTRAN); Stage 2 functional specification of User Equipment (UE) positioning in E-UTRAN (3GPP TS 36.305 version 11.3.0 Release 11) Mar. 18, 2013 consisting of 58-pages.

PCT Invitation to Pay Additional Fees dated Nov. 25, 2014 for International Application Serial No. PCT/IB2014/060272, International Filing Date—Mar. 28, 2014 consisting of 5-pages.

International Search Report and Written Opinion dated Feb. 11, 2015 for International Appliciaion Serial No. PCT/IB2014/060272, International Filing Date—Mar. 28, 2014 consisting of 16-pages.

* cited by examiner

OBSERVED TIME DIFFERENCE OF ARRIVAL ANGLE OF ARRIVAL DISCRIMINATOR

CROSS-REFERENCE TO RELATED APPLICATION

This application is a Submission Under 35 U.S.C. § 371 for U.S. National Stage Patent Application of International Application Number: PCT/IB2014/060272, filed Mar. 28, 2014 entitled "OBSERVED TIME DIFFERENCE OF ARRIVAL ANGLE OF ARRIVAL DISCRIMINATOR," the entirety of which is incorporated herein by reference.

TECHNICAL FIELD

The present disclosure relates to wireless communication systems, and more particularly to determining angles of arrivals of position reference signals for determining a wireless user equipment location.

BACKGROUND

When a user equipment (UE), such as a cellular phone, is used to dial a 911 emergency call center, government regulations call for an ability to determine the location of the UE so that the location may automatically be sent to the 911 emergency call center. Many UEs are equipped with a global positioning system (GPS) receiver that can accurately determine the UE location. However, if the link to GPS satellites is weak or the UE does not have GPS capability, then another method of position determination is called for.

One such method is a technique called observed time difference of arrival (OTDOA). This technique operates by transmitting a special physical channel called a position reference signal (PRS) to the UE from 3 or more base stations such as evolved node Bs (eNBs) in a long term evolution (LTE) communication network. The PRS includes precise timing information. The UE observes the relative arrival times of the signals from nearby eNBs and reports the reference signal time difference (RSTD) observations to a particular serving eNB to which the UE is actively attached. The serving eNB conveys the report of observations to a location server which computes the position estimate of the UE using triangulation. The OTDOA mechanism relies upon accurate knowledge of the antenna locations of the eNBs, an eNB time reference relative to the other eNBs, and the observed time of arrival of a PRS signal at the UE. An error in any of these parameters degrades the position estimate of the UE.

The time of arrival (TOA) of the PRS is presumed to be received from a line of sight (LOS) direction, i.e., a direct path from an antenna of an eNB. Depending on the propagation environment, the LOS path may be attenuated due to an obstruction, such that a relatively stronger signal from the antenna may arrive from the eNB at the UE via a path that includes a reflection. This signal may drown out the LOS signal and may convey inaccurate TOA information.

The accuracy of the estimate of the location of the UE by the location server may be adversely affected by non-LOS propagation of the PRS received at the UE such as may result from reflected multipath signals.

SUMMARY

Methods and systems for determining a UE location based on signal angle of arrival observations are disclosed.

According to one aspect, there is provided a location server for a wireless communication system. The location server includes a memory and a processor. The memory is configured to store reference signal time differences (RSTD), received from a user equipment (UE). Each RSTD is based on a position reference signal (PRS) received by the UE from a different one of a plurality of base stations. The memory is also configured to store observed angles of arrival received from the UE, each observed angle of arrival corresponding to a different one of the RSTDs. The processor is in communication with the memory and is configured to determine a first estimated UE location based on the RSTDs and the known locations of the plurality of base stations. For each RSTD, the processor is configured to determine an estimated angle of arrival based on the first estimated UE location and known locations of the base stations. The processor is also configured to compare an observed angle of arrival with the estimated angle of arrival corresponding to the RSTD, and to weight the RSTD based on the comparison. The processor may also be configured to determine a second estimated UE location based on at least some of the weighted RSTDs and known locations of the plurality of base stations.

According to this aspect, in some embodiments, the location server is located at one of the plurality of base stations. In some embodiments, a magnitude of the weight assigned to an RSTD is inversely proportional to a difference between the estimated angle of arrival and the observed angle of arrival. In some embodiments, a set of three RSTDs with the highest weights is used to estimate the location of the UE. In some embodiments, the second estimated UE location is based on a least squares operation applied to the RSTDs. In some embodiments, the processor is further configured to send an instruction to the UE to suppress a particular one of the PRSs from the plurality of base stations. In some embodiments, the PRS to be suppressed may be associated with an RSTD that has a weight that is lower than a threshold.

According to another aspect, there is provided a UE capable of observing angles of arrival of a plurality of position reference signals (PRS). The UE includes a plurality of antennas and a phase shifter to adjust a relative phase between at least two of the plurality of antennas. A transceiver of the UE is configured to receive and process signals from the antennas, the signals including at least one position reference signal, PRS. A memory is configured to store an angle of arrival of each of the at least one PRS. A processor coupled to the phase shifter, the transceiver, and the memory is configured, for each of the at least one PRS, to adjust the phase shifter to adjust a phase between antennas to steer a null in a signal processed by the transceiver until the PRS is suppressed.

According to this aspect, in some embodiments, the processor is further configured to determine an angle of arrival of the PRS as being the angle to which the null is steered when the PRS is suppressed, and is further configured to cause transmission, via the transceiver, of the determined angle of arrival to a location server. In some embodiments, the PRS that is suppressed is selected by a location server as being received from a direction other than along a line of sight between the UE and a base station from which the PRS is transmitted. In some embodiments, the processor is further configured to, after suppressing the indicated PRS from the non-line of sight direction, detect the PRS received at a different angle of arrival from the base station from which the suppressed PRS is received. In some embodiments, a sensor is configured to enable determination of a spatial orientation of the UE. The sensor establishes a reference plane for determining an angle to which the null is steered. In some embodiments, the UE determines angles of arrivals of multiple PRS, each PRS received from a different one of a plurality of base stations.

According to another aspect, there is provided a method of estimating a position of a user equipment (UE) in a wireless communication system. The method includes receiving from the UE reference signal time differences (RSTDs), each RSTD being based on a position reference signal (PRS) received by the UE from a different base station. The method also includes receiving from the UE observed angles of arrival, each observed angle of arrival corresponding to a different one of the RSTDs. A first estimate of the position of the UE is determined based on the RSTDs and known locations of the base stations corresponding to the RSTDs. For each RSTD, the method includes determining an estimated angle of arrival based on the first estimated position of the UE and the known locations of the base stations; comparing an observed angle of arrival to the estimated angle of arrival; and weighting the corresponding RSTD based on the comparison. The method also includes performing a second estimate of the position of the UE based on the weighted RSTDs and the known locations of the base stations corresponding to the RSTDs.

According to this aspect, in some embodiments, the second estimate is performed based on three weighted RSTDs having highest weights. In some embodiments, the weighted RSTD corresponds to a line-of-sight angle of arrival. In some embodiments, the method further includes sending an instruction to the UE to suppress a particular PRS arriving at an observed angle of arrival based on a determination that the particular PRS corresponds to an observed angle of arrival that differs from its corresponding estimated angle of arrival by more than a threshold. In some embodiments, a magnitude of a weight is inversely proportional to a difference between the observed angle of arrival and the estimated angle of arrival corresponding to the RSTD to which the weight is applied.

According to another aspect, there is provided a method of generating observed angles of arrival of signals from a plurality of base stations and received by a user equipment, UE. The method includes scanning for position reference signals, PRSs, by adjusting a phase difference between antennas to cause a null of a beam of the UE to be incremented through an angular sector. The method also includes determining, for each of the plurality of base stations: an angle of arrival at which the null is steered when a PRS is suppressed by the null; and a reference signal time difference, RSTD. The method also includes transmitting each angle of arrival and corresponding RSTD to a location server.

According to this aspect, in some embodiments, the method includes determining a spatial orientation of the UE to determine a reference plane for the scanning. In some embodiments, the method includes receiving from the location server an indication of a particular one of the PRSs to be suppressed, the PRS to be suppressed being determined to be received from a non-line-of-sight direction. In some embodiments, the indication includes a target angle of arrival at which the PRS to be suppressed is received, and the method further comprises steering a null to the target angle of arrival. In some embodiments, for a particular base station and PRS, the method includes scanning the null to determine if more than one minima of the PRS is encountered, more than one minima indicating that the PRS is received via multiple paths.

DETAILED DESCRIPTION OF THE INVENTION

Before describing in detail example embodiments that are in accordance with the present disclosure, it is noted that the embodiments reside primarily in combinations of apparatus components and processing steps related to determining position of a UE. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements In embodiments discussed herein. AOA data associated with a received position reference signal (PRS) is collected at the user equipment (UE) and sent to a location server along with corresponding reference signal time difference (RSTD) observations. The location server uses this information along with knowledge of radiating antenna coordinates of antennas of the neighboring base stations to establish an estimated angle of arrival. AOAs at the UE can be established using the phase relationship between two or more receive antenna elements of the UE. In some embodiments, the location server uses this estimate to establish a likelihood that one of many PRS arrive by way of a line of sight (LOS) propagation from a given radiating antenna. Based on this likelihood, a weight is applied to the RSTD of each set of observed time difference of arrival (OTDOA) data. Due to a finite dynamic range of the UE receiver in detecting the PRS, detection of a weak line of sight PRS that is impaired by some attenuating obstruction may be degraded in the presence of a strong non-line of sight PRS originating from the same radiating antenna. If this is determined to be the case, a null can be applied in the direction of the stronger non-line of sight signal in order to improve reception of the line of sight signal which can be identified by its faster arrival time.

A null occurs when the output of individual antenna elements are summed with a specific phase offset applied to each element. Because the null response can be made quite sharp, the null response has good qualities for establishing an AOA. In particular, the angle of arrival of a given PRS may be established with good accuracy at a UE with a limited number of antenna elements by phasing antennas at the UE to null out the PRS signal. The angle of arrival of the PRS is determined to be the angle at which the null is steered when the received PRS signal strength is a minimum. Calculation of the angle of arrival may be made relative to a known planar orientation of the UE's antenna elements. Accelerometers used as orientation sensors are commonly installed in UE devices and may be used to establish the planar orientation of the UE's antenna elements.

Figure 1:
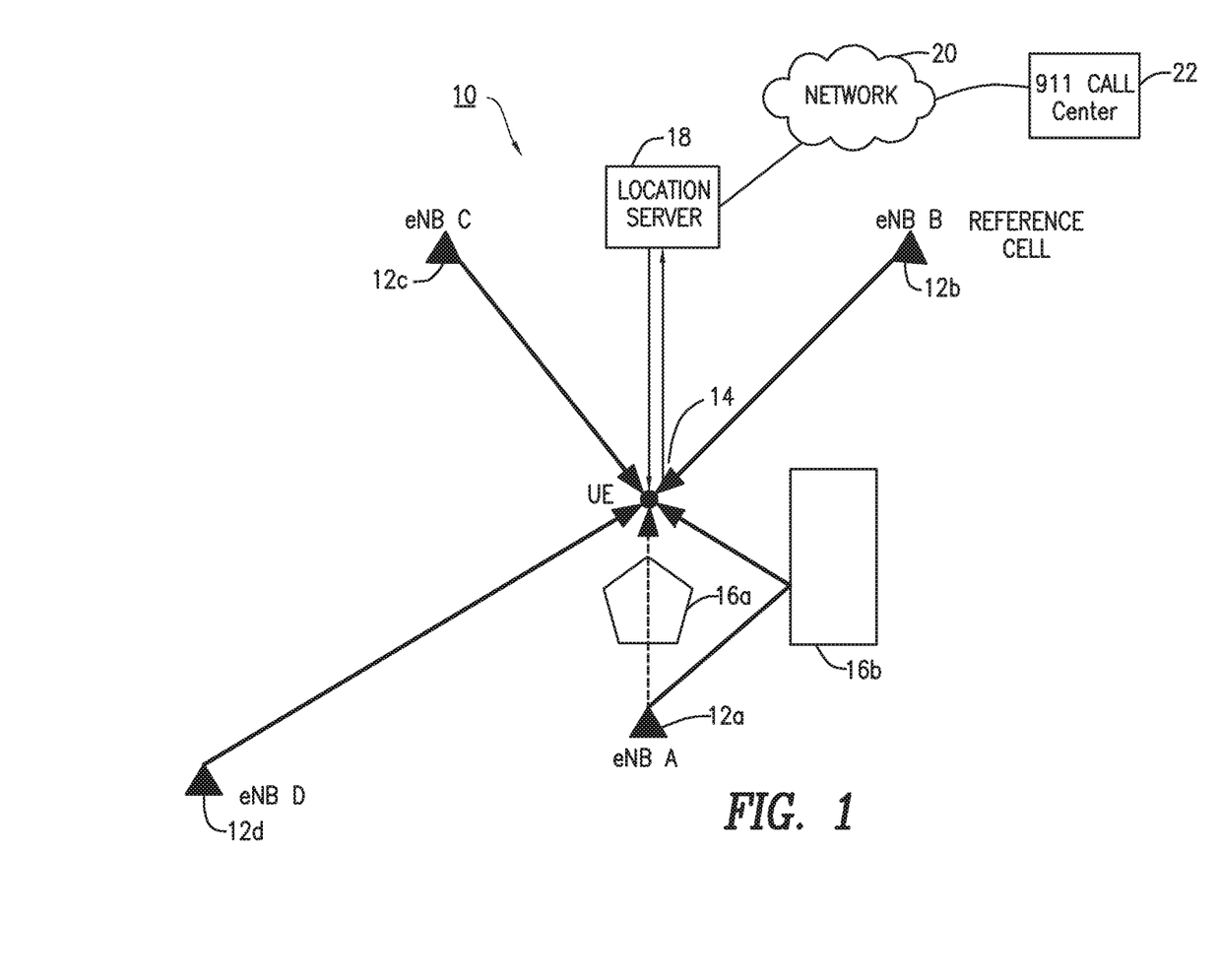
FIG. 1 is a diagram of a system for determining location of a user equipment according to principles of the present disclosure.

Referring now to the drawing figures in which like reference designators denote like elements, there is shown in FIG. 1 a diagram of a configuration 10 of neighboring base stations 12a, 12b, 12c and 12d, referred to collectively herein as base stations 12, or, in long term evolution (LTE) networks, eNBs 12. Each base station 12 transmits a PRS to a UE 14. In the example of FIG. 1, the base stations 12b, 12c and 12d transmit to the UE using a line of sight (LOS), i.e., a direct path from the base station antenna to the UE. As shown in FIG. 1, the signal from the base station 12a arrives from a line of sight that has an obstacle 16a that attenuates the transmitted signal. The signal from the base station 12a also arrives from a non-LOS direction via a reflection from an obstacle 16b. Thus, in the example of FIG. 1, it is possible that a signal from a non-LOS direction may be stronger than the same signal from a LOS direction.

A location server 18, which may be part of a base station 12, may be in direct communication with the UE 14 or may receive OTDOA signal measurement information from the UE 14 indirectly via a base station 12. In some example embodiments, the location server 18 communicates a determined location of the UE via communication network 20 to a 911 call center 22. In operation, the UE 14 observes PRS from the various base stations and determines their angles of arrival. The UE also determines, for each PRS, an RSTD based on a time of flight of the PRS. The angles of arrival and the corresponding RSTDs obtained from the PRS are sent to the location server 18.

Figure 4:
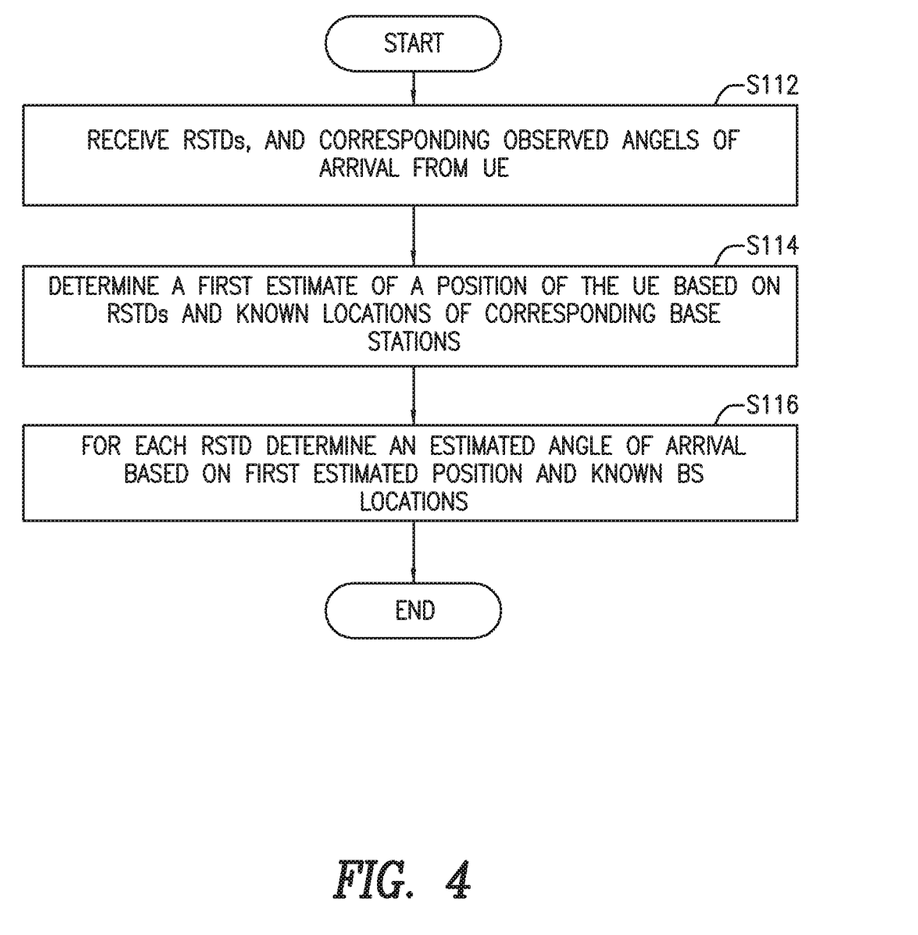
FIG. 4 is a flowchart of a process for calculating a first estimate of UE position based on angles of arrival determined by the UE and transmitted to the location server.
Figure 5:
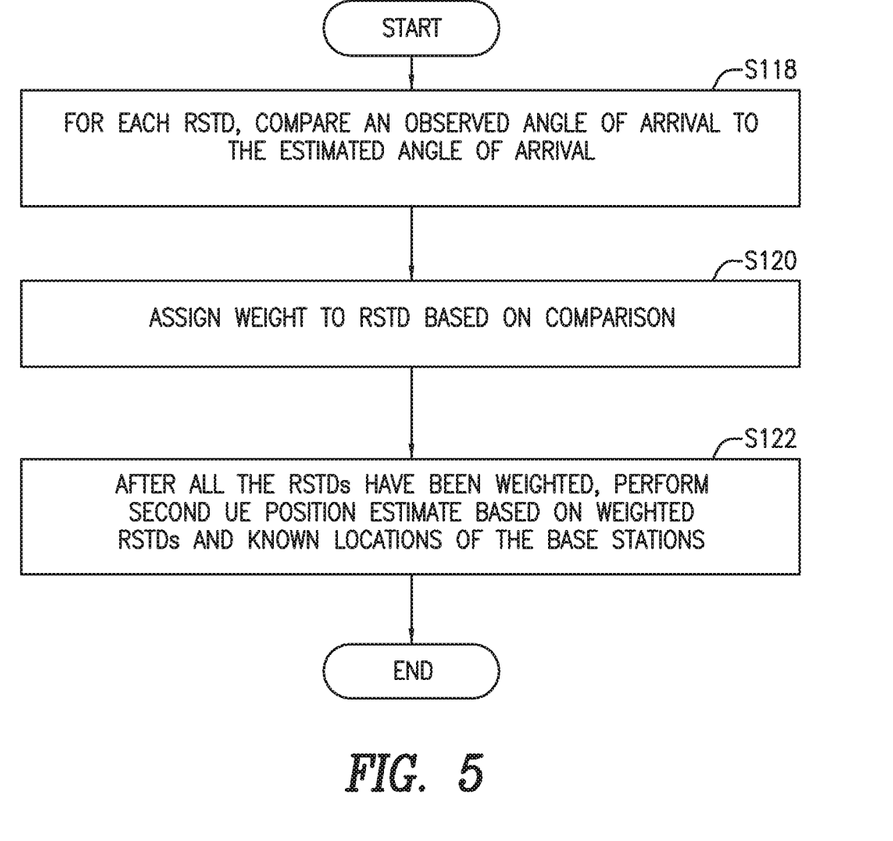
FIG. 5 is a flowchart for calculating a second estimate of UE position based on weighted RSTDs.

The location server 18 determines the location of the UE 14 based on the RSTDs and the known locations of the base stations 12. Further, for each RSTD, the location server 18 compares an estimated angle of arrival, computed based on known locations of the base stations 12, to an angle of arrival observed at the UE 14, to determine a weight to be applied to an RSTD. A greater weight may be assigned to an RSTD when the estimated angle of arrival is close to the observed angle of arrival, and a lesser weight may be assigned to the RSTD when the estimated angle of arrival differs substantially from the observed angle of arrival. Then, in some example embodiments, the location server 18 computes a more accurate estimation of the position of the UE 14 using some or all of the weighted RSTDs. This is described in more detail below with reference to the flowcharts of FIGS. 4A and 4B.

Figure 2:
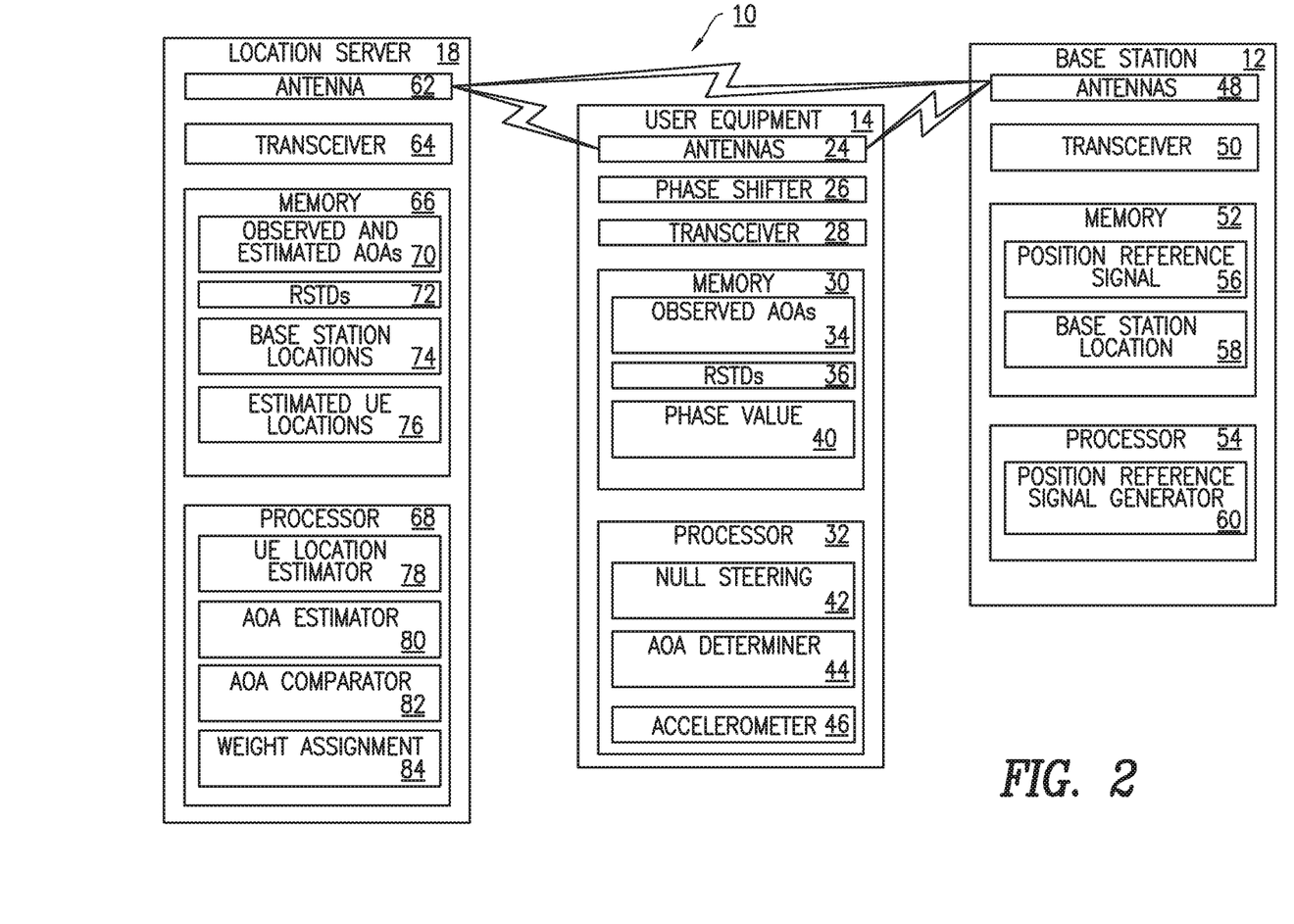
FIG. 2 is a block diagram of a communication system having a base station, a user equipment and a location server arranged to estimate UE position in accordance with principles of the present disclosure.

FIG. 2 is a more detailed block diagram of a communication system 10 having the base station 12, the user equipment 14 and the location server 18. Note that the location server 18 may, in some embodiments, be located at the base station 12, and in some embodiments, may communicate only indirectly with the UE 14 via a base station 12. The UE 14 has at least two antennas 24 for receiving PRS and for transmitting OTDOA signal measurement information, which includes RSTD and AOA, and may also include LOS quality data. A phase shifter 26 enables shifting of the relative phase between signals received by the antennas 24 in order to sweep a null signal through an angular sector. A transceiver 28 of the user equipment 14 transmits the radio frequency (RF) signals carrying the OTDOA signal measurement information to the location server 18, and receives PRS from a plurality of base stations 12.

The UE 14 includes a memory 30 and a processor 32. The memory 30 stores observed angles of arrival 34, RSTDs 36 and phase values 40 for adjusting the phase shifter 26. The memory may also be configured to store computer code that, when executed by the processor 32, causes the processor 32 to perform UE functions described herein. The processor 32, when executing software, includes functionality to cause null steering 42 and to determine observed angles of arrival 44. In particular, the processor may perform operations that include adjusting a phase value 40, measuring a PRS magnitude, continuing to adjust phase until a minimum in the PRS magnitude occurs, and determining the angle of the null at which the minimum occurs to be the angle of arrival for the particular PRS.

Further, the processor 32 may cause suppression of a PRS signal received at a particular angle, while searching for a minimum of the PRS signal occurring at another angle. Where multiple PRS minimums occur, the processor 32 may determine the angle of arrival of the PRS 44, having a least RSTD. Note that the UE 14 may also include a sensor such as an accelerometer 46 to ascertain an orientation of the UE 14 to ensure that the UE is in a particular orientation, such as vertical, for determining an observed angle of arrival with respect to a reference plane.

In some embodiments, a PRS arriving from a particular angle that is determined by the location server 18 to be from a direction other than a line of sight, may be suppressed. The non-LOS signal from the particular angle may be suppressed by steering a null to the particular angle at the UE 14. In some embodiments, the processor 32 of the UE 14 is further configured, after suppressing the indicated PRS from the non-line of sight direction, to detect the PRS received from a different angle of arrival. Thus, the UE 14 may perform any one or more of at least two major functions: (1) determining observed angles of arrival and corresponding RSTDs to be used by the location server 18 to determine UE position, and (2) suppressing PRS from non-line of sight directions and detecting the PRS at another angle of arrival. Suppressing a PRS from a non-LOS angle of arrival of a PRS can improve reception of the PRS arriving at a LOS angle of arrival.

Note that the OTDOA information may be sent to the location server 18 directly from the UE 14. Alternatively, the OTDOA information may be sent by the UE 14 to the base station 12 from which it is forwarded to the location server 18. In some embodiments, the location server 18 may be located at a base station 12. The base station 12 includes at least one antenna 48, a transceiver 50, a memory 52 and a processor 54. The transceiver 50 operates to prepare data to be transmitted and to convert received data to baseband for processing by the processor 54. The memory 52 stores position reference signals (PRS) 56 and a location 58 of the base station 12. The memory 52 may also be configured to store computer code that, when executed by a processor 54, causes the processor 54 to perform base station functions described herein. The processor 54, when executing software, generates, via a PRS generator 60, the PRS for transmission to the UE 14 by the transceiver 50 of the base station 12.

The location server 18 includes at least one antenna 62 and a transceiver 64 to receive OTDOA measurement information from the UE 14. The location server 18 also includes a memory 66 and a processor 68. The memory 66 stores observed and estimated angles of arrival 70, RSTDs 72, base station locations 74, and estimated UE locations 76. The memory 66 may also be configured to execute computer code that, when executed by a processor 68, causes the processor 68 to perform location server functions described herein. The processor 68, when executing computer code, functions to perform UE location estimation 78, angle of arrival (AOA) estimation 80, AOA comparison 82, and weight assignment 84.

In operation, the processor 68 of the location server 18 computes estimated UE locations based on RSTDs and known base station locations, and computes estimated UE locations based on the observed angles of arrival and known base station locations via trilateration, i.e., by determining an intersection of lines extending from the base stations at the observed angles of arrival. The processor 68 may also compute angles of arrival based on the UE location estimate and known base station locations, and compare these computed angles of arrival to angles of arrival observed at the UE 14. The processor 68 may eliminate RSTDs from the computation of UE location when the difference between the observed and estimated AOA corresponding to the RSTD is large, i.e., greater than a predetermined amount. The processor 68 may also assign a weight to an RSTD that depends upon a magnitude of a difference between the estimated angle of arrival and the observed angle of arrival. Thus, the location server 18 may perform any one or more of at least three major functions: (1) comparing an observed angle of arrival to an estimated angle of arrival to determine a weight to be assigned to a corresponding RSTD, (2) computing an estimated UE position based on the weighted RSTDs and (3) instructing the UE 14 to suppress a particular one of the PRS corresponding to an RSTD determined to be from a non-line-of-sight.

The processor 68 of the location server 18 is in communication with the memory 66 and is configured to determine a first estimated UE location based on the RSTDs and the known locations 74 of the plurality of base stations 12. For each RSTD, the processor 68 is configured to determine an estimated angle of arrival 70 based on the first estimated UE location 76 and known locations of the base stations 74. The processor 68 is also configured to compare an observed angle of arrival with the estimated angle of arrival corresponding to the RSTD, and to weight the RSTD based on the comparison. In some embodiments, the processor 68 is also configured to determine a second estimated UE location 100 based on at least some of the weighted RSTDs and 74 known locations of the plurality of base stations. Thus, improved accuracy in determining the position of a UE may be achieved in some embodiments by assigning higher weighting to LOS data and lower weighting to non-LOS data. The location server 18 may optionally instruct the UE to suppress a PRS determined to be from a non-line of sight direction.

Figure 3:
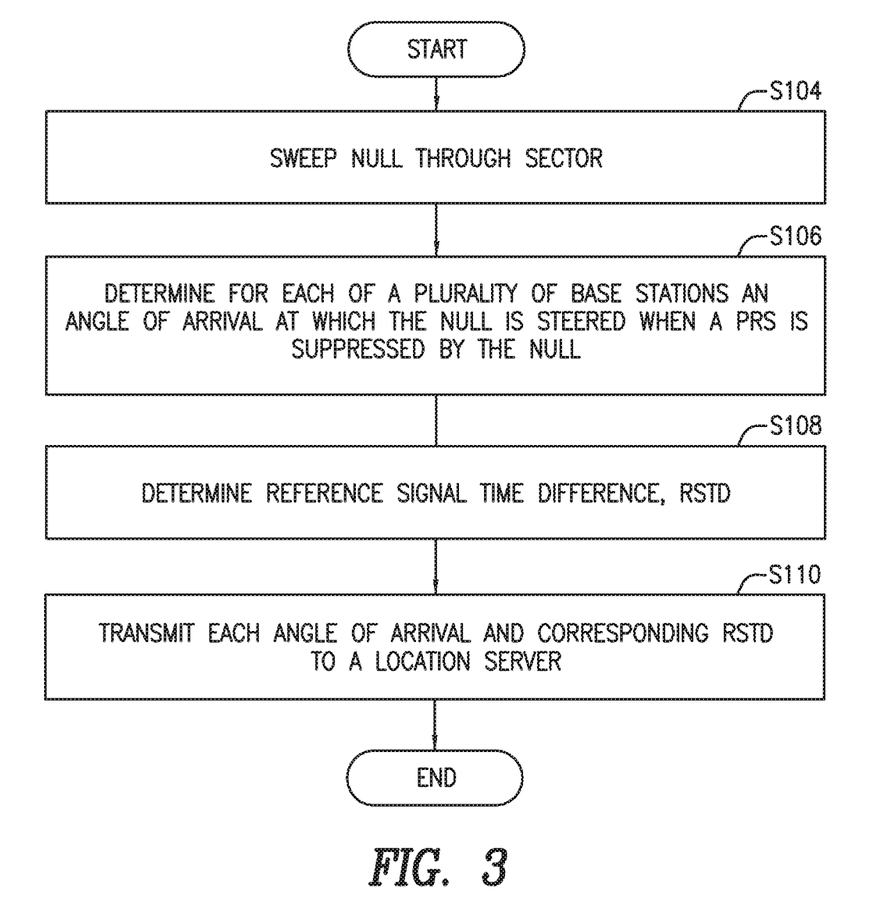
FIG. 3 is a flowchart of a process for determining and reporting angles of arrival of position reference signals (PRS) at a UE.

FIG. 3 is a flowchart of a process performed by the UE 14 for determining and reporting angles of arrival of position reference signals at a UE 14. Not shown in FIG. 3 is an optional initial step of determining UE orientation. Thus, the orientation sensors 46 of the UE 14 may be used to determine if the UE 14 has a specific planar orientation that is acceptable for determining angles of arrival. For example, the sensors 46 may determine whether the UE 14 is oriented vertically plus or minus 30°. In some embodiments, a null value is reported with the OTDOA signal measurement information from the UE 14 to the location server 18 if a suitable orientation of the UE 14 is not found within a pre-determined amount of time, the null value indicating that an angle of arrival has not been detected for a particular PRS.

If the orientation of the UE 14 is acceptable, then, for each of a plurality of PRSs, the signals received at each of at least two antennas 24 of the UE 14 are phased with respect to each other to sweep a null in a beam formed by the antennas 24 through an angular sector such as 360° (block S104). A phase shifter 26 for varying the phase between the signals may be incremented according to pre-determined increments. The angle of arrival for a particular PRS is determined as the angle at which the PRS minimum occurs. In other words, the angle to which the null is steered to suppress the PRS signal is the observed angle of arrival of the PRS signal (block S106). Additionally, the beam null may optionally be scanned so as to determine whether more than one minima of a particular PRS being scanned is encountered, thereby indicating that the PRS is received by multiple paths. One of the angles of arrival, for example, the angle of arrival from a base station to which the UE is attached, may be used as a reference angle against which the other angles of arrival are measured. Each determined angle of arrival is associated with an RSTD determined by the UE (block S108). Each observed angle of arrival and corresponding RSTD is transmitted from the UE 14 to the location server 18 (block S110).

FIG. 4 is a flowchart of a process performed by the location server 18 for calculating the estimated position of a UE 14 based on angles of arrival determined by the UE 14 and transmitted to the location server 18. OTDOA signal measurement information is received by the location server 18 (block S112). The OTDOA signal measurement information includes at least two UE observations for each of a plurality of base stations 12. The at least two UE observations include an RSTD and an observed angle of arrival. A first estimated UE location is calculated using multilateration based on the received RSTDs observed at the UE 14 and knowledge of the locations of the eNBs 12 possessed by the location server 18 (block S114). An estimated angle of arrival from a particular eNB 12 is calculated based on the estimated UE location and physical locations of the eNBs 12 (block S116).

FIG. 5 is a flowchart of a process for weighting RSTDs and computing a second estimate of UE position. For each RSTD, the estimated angle of arrival is compared to the observed angle of arrival (block S118).

A weight may be assigned to the RSTD based on the difference between the observed angle of arrival and the estimated angle of arrival (block S120). A magnitude of a weight assigned to an RSTD may be inversely proportional to a difference between the estimated angle of arrival and the observed angle of arrival, so that a larger weight is applied when the difference between the estimated AOA and the observed AOA is small, and a smaller weight is applied when the difference is large. After all the RSTDs have been weighted, a second estimate of the UE may be calculated using the highest weighted RSTDs and the known base station locations (block S122).

Thus, if the difference between the observed angle of arrival and the estimated angle of arrival is sufficiently small as compared to a threshold for each of at least three RSTDs, then the UE location may be estimated using multilateration and the weighted RSTDs. RSTDs corresponding to a difference between the observed angle of arrival and an estimated angle of arrival that is not as small as the threshold may be discarded. When the total number of non-discarded RSTDs, including the RSTD of the reference eNB 12, is greater than two, then trilateration based on the 3 RSTDs having the highest quality may be performed. Also, more than three RSTDs may be employed in a weighted formula, such as a least squares method, to compute the UE location. This second estimate of UE location is, in some embodiments, provided by the location server 18 to the 911 call center 22 via the network 20. Note that the embodiments of FIGS. 4 and 5 contemplate the possibility of using a non-line-of-sight PRS in a least squares calculation of estimated UE position. For example, some RSTDs that are less than the threshold may correspond to non-LOS PRS. This may result from a non-LOS path being very short or from a condition where many non-LOS PRS signals are received from a base station.

Figure 6:
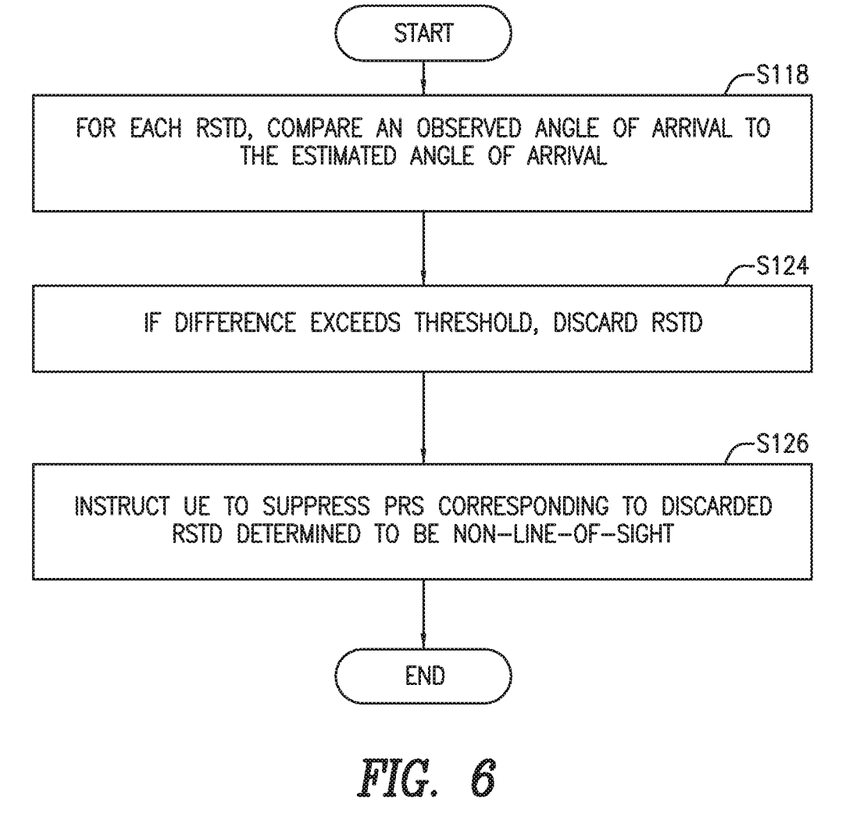
FIG. 6 is a flowchart of a process for determining when to discard an RSTD and instruct a UE to suppress the PRS corresponding to the discarded RSTD.

FIG. 6 is a flowchart of a process for making a determination to discard an RSTD and optionally instruct the UE to suppress the corresponding PRS arriving from the corresponding observed angle of arrival. As mentioned above with reference to FIG. 5, the location server 18 compares, for each RSTD, an observed angle of arrival to an estimated angle of arrival (block S118). If the difference between the observed angle of arrival and the estimated angle of arrival exceeds the threshold, the corresponding RSTD is discarded (block S124). In some embodiments, the method includes sending an instruction to the UE to suppress a particular PRS arriving at an observed angle of arrival corresponding to the discarded RSTD, which is considered to be from a non-line-of-sight direction (block S126).

Figure 7:
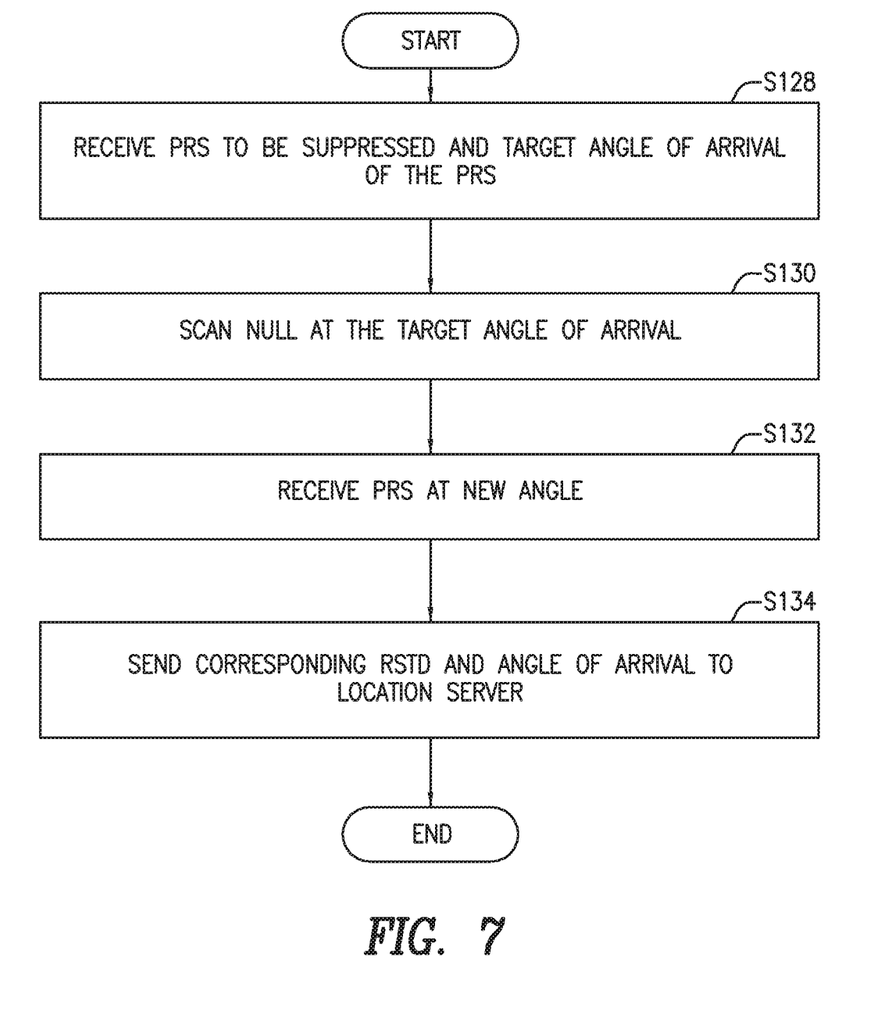
FIG. 7 is a flowchart of a process for suppressing a PRS received from a non-LOS angle of arrival.

FIG. 7 is a flowchart of an example process for suppressing PRS received from the non-LOS angles of arrival. The UE 14 receives the instruction from the location server 18 to suppress a PRS at a target angle of arrival from the location server (block S128). The PRS to be suppressed is one that is deemed to arrive by a non-LOS direction, based on the observed angle of arrival differing from the estimated angle of arrival by an amount exceeding the threshold.

The UE 14 may scan a null in the beam to the target angle of arrival to suppress the particular PRS (block S130). Suppressing a high power non-LOS version of the PRS enables better detection of a lower power LOS version of the PRS that arrives earlier than the suppressed PRS arriving at the target angle. Thus, a first null may be steered to the angle of arrival of the high power non-LOS version of the PRS and a second null may be swept to determine an angle of arrival for one or more versions of the PRS signal that has a smaller RSTD value. Once the PRS from the non-LOS direction is suppressed, the UE 14 may scan its beam to find the PRS arriving at a different angle of arrival (block S132). This angle and a corresponding RSTD may be sent to the location server 18 (block S134).

Note that in some embodiments, a value may be assigned to another parameter called "LOS quality" or "RSTD quality" measured by the UE and included within the OTDOA signal measurement information. A large LOS quality rating may be assigned to strongly received PRS and small LOS quality rating may be assigned to weakly received PRS. When this information is received by the location server, the location server may weight a corresponding RSTD based at least in part on the received LOS quality rating, where signals having a large LOS quality rating are weighted more heavily than signals having lower LOS quality rating. Thus, the LOS quality rating may be based on the PRS signal strength and may be affected by signal to noise ratio of the PRS, signal to noise ratio of a reference PRS, detected orientation of the UE 14, and the number of UE antennas.

Thus, embodiments may provide improved accuracy of position estimates of a UE by assigning weights to RSTDs measured by the UE based on a comparison of an angle of arrival observed by the UE to an estimated angle of arrival computed by a location server. Non-LOS PRSs received by the UE may be nulled to enable better detection of a PRS received from a LOS direction or a stronger PRS received from a non-LOS direction.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method, performed by a location server, of estimating a position of a user equipment (UE) in a wireless communication system, the method comprising:
 receiving from the UE:
  a plurality of reference signal time differences (RSTDs), the plurality of RSTDs being based on a plurality of distinct position reference signals (PRSs), respectively, wherein the plurality of distinct PRSs are received by the UE from a plurality of base stations, respectively; and
  a plurality of observed angles of arrival (AOAs), each of the plurality of observed AOAs corresponding to a different one of the plurality of RSTDs;
 determining a first estimated position of the UE using multilateration, based on the plurality of RSTDs and known locations of the plurality of base stations;
 performing a weighting process to the plurality of RSTDs, the weighting process comprising:
  determining an estimated AOA for a first RSTD of the plurality of RSTDs based on the first estimated position of the UE and the known locations of the plurality of base stations;

comparing the observed AOA corresponding to the first RSTD to the estimated AOA; and assigning a weight to the first RSTD, a magnitude of the assigned weight being inversely proportional to a difference between the estimated AOA and the observed AOA corresponding to the first RSTD; and determining a second estimated position of the UE based on at least three weighted received RSTDs having highest weights and the known locations of the plurality of base stations.

2. The method of claim 1, wherein the weighted first RSTD corresponds to a line-of-sight angle of arrival.

3. The method of claim 1, further comprising sending an instruction to the UE to suppress, a particular PRS arriving at an observed angle of arrival, based on a determination that the particular PRS corresponds to an observed angle of arrival that differs from its corresponding estimated angle of arrival by more than a threshold.

* * * * *